(12) United States Patent
Takahata

(10) Patent No.: US 10,005,105 B2
(45) Date of Patent: Jun. 26, 2018

(54) ULTRASONIC SENSOR DRIVING CIRCUIT

(71) Applicant: MURATA MANUFACTURING CO., LTD., Nagaokakyo-Shi, Kyoto-fu (JP)

(72) Inventor: Satoshi Takahata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 854 days.

(21) Appl. No.: 14/535,574

(22) Filed: Nov. 7, 2014

(65) Prior Publication Data

US 2015/0063073 A1 Mar. 5, 2015

Related U.S. Application Data

(63) Continuation of application No. PCT/JP2013/062322, filed on Apr. 26, 2013.

(30) Foreign Application Priority Data

May 7, 2012 (JP) ................................. 2012-105704

(51) Int. Cl.
*B60B 1/00* (2006.01)
*B06B 1/02* (2006.01)
(Continued)

(52) U.S. Cl.
CPC ............ *B06B 1/0207* (2013.01); *G01S 7/524* (2013.01); *G01S 15/10* (2013.01); *G01S 15/104* (2013.01);
(Continued)

(58) Field of Classification Search
USPC ........................................................ 367/137
See application file for complete search history.

(56) References Cited

U.S. PATENT DOCUMENTS 3,491,333 A * 1/1970 Goulet .................... G01S 7/529
  324/76.83
5,553,035 A * 9/1996 Seyed-Bolorforosh ...................
  B06B 1/0622
  310/320

(Continued)

FOREIGN PATENT DOCUMENTS

JP 57-108776 A 6/1982
JP 2-35082 U 3/1990

(Continued)

OTHER PUBLICATIONS

T. Kling ; K.K. Shung ; G.A. Thieme, "Reverberation reduction in ultrasonic B-mode images via dual frequency image subtraction". IEEE Transactions on Medical Imaging ( vol. 12, Issue: 4, Dec. 1993) p. 792-802.*

(Continued)

*Primary Examiner* — James R Hulka
(74) *Attorney, Agent, or Firm* — Arent Fox LLP

(57) ABSTRACT

An ultrasonic sensor includes a signal generation circuit, an amplifier, and a matching circuit as a transmission-side circuit. The signal generation circuit includes a driving signal generation circuit that generates a driving signal for transmitting ultrasonic waves from an ultrasonic transducer for transmission and reception and a reverberation suppression signal generation circuit that generates a reverberation suppression signal for suppressing reverberation occurring at the ultrasonic transducer from which the ultrasonic waves are transmitted. The reverberation suppression signal generation circuit generates the reverberation suppression signal having a frequency of 1/2 times the frequency of the driving signal and applies the reverberation suppression signal to the ultrasonic transducer at a time delayed from the driving signal by a half wavelength. With the above configuration, (Continued)

an ultrasonic sensor driving circuit capable of reducing the duration of the reverberation occurring at the ultrasonic transducer is provided.

18 Claims, 3 Drawing Sheets

(51) Int. Cl.
 *G01S 7/524* (2006.01)
 *G01S 15/10* (2006.01)
(52) U.S. Cl.
 CPC ....... *B06B 2201/30* (2013.01); *B06B 2201/55* (2013.01)

(56) References Cited

U.S. PATENT DOCUMENTS

| | | | |
|---|---|---|---|
| 5,906,580 A * | 5/1999 | Kline-Schoder | B06B 1/064 310/334 |
| 6,005,916 A * | 12/1999 | Johnson | A61B 5/05 378/87 |
| 6,215,223 B1 * | 4/2001 | Furukoshi | H02N 2/14 310/316.01 |
| 2004/0193052 A1 | 9/2004 | Ogawa | |
| 2006/0238067 A1 * | 10/2006 | Dausch | B06B 1/0622 310/311 |
| 2010/0168583 A1 * | 7/2010 | Dausch | A61B 8/12 600/466 |
| 2014/0043940 A1 * | 2/2014 | Niwa | G10K 11/18 367/87 |

FOREIGN PATENT DOCUMENTS

| | | |
|---|---|---|
| JP | H03-074560 A | 3/1991 |
| JP | H03-276084 A | 12/1991 |
| JP | H08146121 A | 6/1996 |
| JP | H11-64493 A | 3/1999 |
| JP | 2000-249583 A | 9/2000 |
| JP | 2001-017916 A | 1/2001 |
| JP | 2005-121509 A | 5/2005 |
| JP | 2006-145403 A | 6/2006 |
| JP | 2007-085867 A | 4/2007 |

OTHER PUBLICATIONS

Nasholm, S. P., Hansen, R., Masoy, S. E., Johansen, T. F., & Angelsen, B. A. (2009). Transmit beams adapted to reverberation noise suppression using dual-frequency SURF imaging. IEEE transactions on ultrasonics, ferroelectrics, and frequency control, 56(10), 2124-2133.*
Azuma, T., Ogihara, M., Kubota, J., Sasaki, A., Umemura, S. I., & Furuhata, H. (2010). Dual-frequency ultrasound imaging and therapeutic bilaminar array using frequency selective isolation layer. IEEE transactions on ultrasonics, ferroelectrics, and frequency control, 57(5), 1211-1224.*
Claudon, M., Tranquart, F., Evans, D. H., LefÂvre, F., & Correas, J. (2002). Advances in ultrasound. European radiology, 12(1), 7-18.*
Written Opinion and International Search Report issued in PCT/JP2013/062322 dated Jun. 4, 2013.
International Search Report issued for PCT/JP2013/062322, dated Jun. 4, 2013.

* cited by examiner

ULTRASONIC SENSOR DRIVING CIRCUIT

CROSS REFERENCE TO RELATED APPLICATIONS

The present application is a continuation of PCT/JP2013/062322 filed Apr. 26, 2013, which claims priority to Japanese Patent Application No. 2012-105704, filed May 7, 2012, the entire contents of each of which are incorporated herein by reference.

FIELD OF THE INVENTION

The present invention relates to an ultrasonic sensor driving circuit that drives an ultrasonic sensor transmitting and receiving ultrasonic waves with one transducer.

BACKGROUND OF THE INVENTION

Some ultrasonic sensors that detect objects or measure distances by transmitting and receiving ultrasonic waves using ultrasonic transducers each use one ultrasonic element as an ultrasonic element for transmission and an ultrasonic element for reception in order to reduce the ultrasonic sensors in size. The frequencies of the ultrasonic waves to be transmitted and received are set to the resonant frequencies of the ultrasonic transducers in the ultrasonic sensors and electrical pulse signals of the resonant frequencies (including frequencies approximating to the resonant frequencies) are applied to the ultrasonic transducers. In this case, a phenomenon called reverberation in which ultrasonic vibration mechanically continues for a short time occurs even after the application of the electrical pulse signals is stopped. When one ultrasonic transducer is used as the ultrasonic element for transmission and the ultrasonic element for reception, the reverberation can prevent the detection from the received ultrasonic waves.

Patent Document 1 discloses an ultrasonic sensor intended to reduce the duration of the reverberation. The ultrasonic sensor described in Patent Document 1 is configured so as to, immediately after a driving signal to be intermittently supplied to the ultrasonic transducer is stopped, supply a reverberation suppression signal having a phase opposite to the phase of the driving signal to the ultrasonic transducer only during a time period corresponding to the half period of the driving signal to drive the ultrasonic transducer. Accordingly, the vibration is cancelled only during the time period corresponding to the half cycle of the driving signal immediately after the ultrasonic transducer is driven to reduce the duration of the reverberation.

Patent Document 1: Japanese Unexamined Patent Application Publication No. 9-146121

Inductance components other than the ultrasonic transducer, for example, inductance components in a step-up transformer are included in the circuit of each ultrasonic sensor. Since the other inductance components are not considered in the ultrasonic sensor described in Patent Document 1, there are cases in which the reverberation suppression signal is affected by the effect of the other inductance component and so on to prevent the vibration of the ultrasonic transducer from being sufficiently cancelled.

SUMMARY OF THE INVENTION

It is an object of the present invention to provide an ultrasonic sensor driving circuit capable of reducing the duration of the reverberation occurring in the ultrasonic transducer, compared with related art.

The present invention provides an ultrasonic sensor driving circuit including a signal generation circuit that generates a driving signal for transmitting ultrasonic waves from an ultrasonic transducer for transmission and reception; and a matching circuit that includes a step-up transformer and that performs impedance matching between the signal generation circuit and the ultrasonic transducer. The driving signal generated by the signal generation circuit is applied to the ultrasonic transducer through the matching circuit. The signal generation circuit includes a reverberation suppression signal generation circuit that generates a reverberation suppression signal for suppressing reverberation occurring at the ultrasonic transducer from which the ultrasonic waves are transmitted. The reverberation suppression signal generation circuit generates the reverberation suppression signal having a frequency that is different from a frequency of the driving signal and applies the reverberation suppression signal to the ultrasonic transducer after the application of the driving signal is stopped.

With the above configuration, the reverberation suppression signal having a frequency different from that of the driving signal is applied to the ultrasonic transducer during the time period in which the reverberation occurs after the application of the driving signal is stopped. Accordingly, although the reverberation is temporarily increased immediately after the application of the reverberation suppression signal, the reverberation is subsequently rapidly attenuated because phase change is caused so that the signal components of the reverberation which are complicatedly superimposed cancel each other to reduce the duration of the reverberation, compared with the related art.

In the ultrasonic sensor driving circuit according to the present invention, the reverberation suppression signal generation circuit may generate the reverberation suppression signal having a frequency of 1/1.33 times to 1/4 times the frequency of the driving signal.

With the above configuration, it is possible to reduce the duration of the reverberation.

In the ultrasonic sensor driving circuit according to the present invention, the reverberation suppression signal generation circuit may generate the reverberation suppression signal having a frequency of 1/1.78 times to 1/2.3 times the frequency of the driving signal.

With the above configuration, it is possible to further reduce the duration of the reverberation.

In the ultrasonic sensor driving circuit according to the present invention, the reverberation suppression signal generation circuit may generate the reverberation suppression signal having a frequency of 1/2 times the frequency of the driving signal.

With the above configuration, it is possible to minimize the duration of the reverberation.

In the ultrasonic sensor driving circuit according to the present invention, the reverberation suppression signal generation circuit may apply the reverberation suppression signal at a time delayed from the driving signal by a half wavelength of the driving signal.

With the above configuration, it is possible to further reduce the duration of the reverberation.

In the ultrasonic sensor driving circuit according to the present invention, the reverberation suppression signal generation circuit may generate the reverberation suppression signal having an amplitude greater than that of the driving signal.

With the above configuration, it is possible to further reduce the duration of the reverberation.

According to the present invention, the reverberation suppression signal having a frequency different from that of the driving signal is applied to the ultrasonic transducer during the time period in which the reverberation occurs after the application of the driving signal is stopped. Accordingly, although the reverberation is temporarily increased immediately after the application of the reverberation suppression signal, the reverberation is subsequently rapidly attenuated because phase change is caused so that the signal components of the reverberation which are complicatedly superimposed cancel each other to reduce the duration of the reverberation, compared with the related art.

DETAILED DESCRIPTION OF THE PREFERRED EMBODIMENTS

An ultrasonic sensor driving circuit according to the present invention is used for an ultrasonic sensor that uses one ultrasonic transducer for transmission and reception. This ultrasonic sensor is used in, for example, a car back sonar. The ultrasonic sensor transmits ultrasonic waves and receives reflected waves of the ultrasonic waves that are output to detect an object or measure a distance.

First Embodiment

Figure 1:
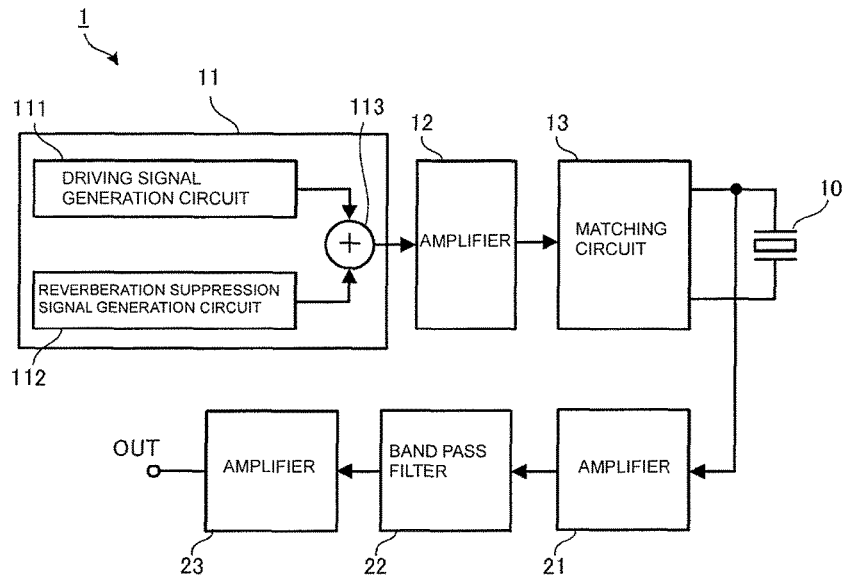
FIG. 1 is a circuit block diagram of an ultrasonic sensor according to an embodiment.

FIG. 1 is a circuit block diagram of an ultrasonic sensor according to the present embodiment. An ultrasonic sensor 1 includes an ultrasonic transducer 10 that transmits and receives the ultrasonic waves. The ultrasonic sensor 1 includes a transmission-side circuit that transmits the ultrasonic waves from the ultrasonic transducer 10 and a reception-side circuit that performs signal processing to the ultrasonic waves received by the ultrasonic transducer 10.

The transmission-side circuit is an ultrasonic sensor driving circuit according to the present invention and includes a signal generation circuit 11, an amplifier 12, and a matching circuit 13. The signal generation circuit 11 includes a driving signal generation circuit 111, a reverberation suppression signal generation circuit 112, and a combining circuit 113.

Figure 2:
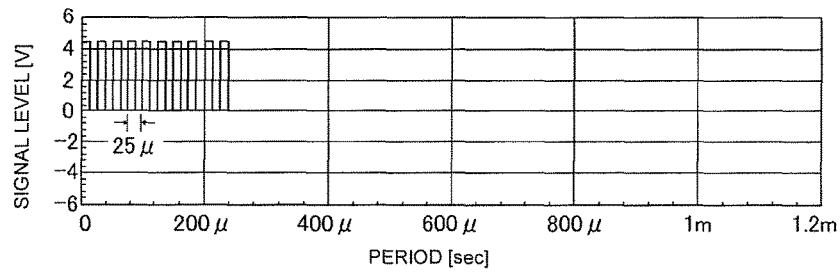
FIG. 2 illustrates a waveform of a driving signal generated by a driving signal generation circuit.

The driving signal generation circuit 111 generates a driving signal of a rectangular pulse having the same frequency as that of the ultrasonic waves to be transmitted from the ultrasonic transducer 10. FIG. 2 illustrates a waveform of the driving signal generated by the driving signal generation circuit 111. As illustrated in FIG. 2, the driving signal generation circuit 111 generates ten pulse signals and that has a frequency of about 40 kHz and a signal level (amplitude) of about 4.5 V to supply the pulse signal to the combining circuit 113.

Figure 3:
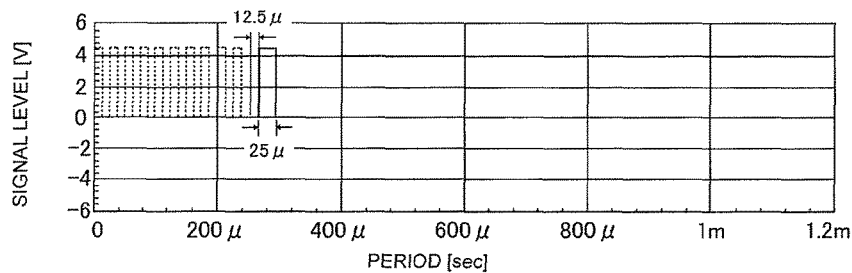
FIG. 3 illustrates a waveform of a reverberation suppression signal generated by a reverberation suppression signal generation circuit.

The reverberation suppression signal generation circuit 112 generates a reverberation suppression signal used to suppress reverberation occurring at the ultrasonic transducer 10. FIG. 3 illustrates a waveform of the reverberation suppression signal generated by the reverberation suppression signal generation circuit 112. The waveform of the driving signal illustrated in FIG. 2 is denoted by broken lines in FIG. 3. As illustrated in FIG. 3, the reverberation suppression signal generation circuit 112 generates the reverberation suppression signal having a frequency and a phase different from those of the driving signal generated by the driving signal generation circuit 111. Specifically, the reverberation suppression signal generation circuit 112 generates one pulse signal and that has a frequency of about 20 kHz and a signal level (amplitude) of about 4.5 V as the reverberation suppression signal. The reverberation suppression signal generation circuit 112 supplies the generated reverberation suppression signal to the combining circuit 113 the half period of the driving signal after the driving signal generation circuit 111 stops the output of the driving signal to the combining circuit 113.

Figure 4:
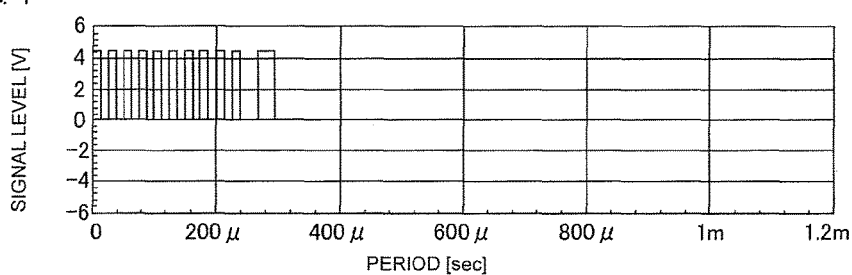
FIG. 4 illustrates a waveform of a high-frequency signal resulting from addition in a combining circuit.

The combining circuit 113 includes an adder that adds the driving signal generated by the signal generation circuit 11 to the reverberation suppression signal generated by the reverberation suppression signal generation circuit 112. FIG. 4 illustrates a waveform of a high-frequency signal resulting from the addition in the combining circuit 113. The high-frequency signal having the waveform illustrated in FIG. 4 is supplied to the amplifier 12 downstream of the signal generation circuit 11.

The amplifier 12 amplifies the signal level (amplitude) of the high-frequency signal supplied from the signal generation circuit 11. The amplifier 12 supplies the high-frequency signal the signal level of which is amplified to the matching circuit 13 downstream of the amplifier 12. The matching circuit 13 includes a step-up transformer including a primary winding and a secondary winding. The matching circuit 13 performs impedance matching between the signal generation circuit 11 (more specifically, the amplifier 12) and the ultrasonic transducer 10.

The reception-side circuit includes an amplifier 21, a band pass filter 22, and an amplifier 23. The reception-side circuit amplifies the signal level of an ultrasonic signal received by the ultrasonic transducer 10 with the amplifier 21 and selectively passes signals within a certain frequency band included in the ultrasonic signal that is received with the band pass filter 22 to remove unnecessary frequency components. The amplifier 23 amplifies the signal level of the filtered signal and supplies it to a downstream circuit. The downstream circuit is, for example, a circuit that detects an object or a distance from the ultrasonic signal that is received. The reception-side circuit may be included in the ultrasonic sensor driving circuit according to the present invention.

The ultrasonic transducer 10 transmits the ultrasonic waves corresponding to the driving signal generated by the driving signal generation circuit 111 in response to the high-frequency signal including the driving signal, which is applied from the signal generation circuit 11. The ultrasonic transducer 10 receives the reflected waves of the ultrasonic waves that are output. The ultrasonic transducer 10 includes an electrode and a piezoelectric body and is capable of converting an electrical signal into mechanical vibration or converting the mechanical vibration into the electrical signal, thus transmitting and receiving the ultrasonic waves. Accordingly, upon driving of the ultrasonic transducer 10 to which the driving signal is applied, the reverberation in which the vibration mechanically continues for a short time occurs after the application of the high-frequency signal is stopped and the reverberation can prevent, for example, the detection of an object or a distance from the received ultrasonic waves.

However, in the present embodiment, the reverberation suppression signal is included in the high-frequency signal. The reverberation suppression signal has a frequency different from that of the driving signal and is applied to the ultrasonic transducer 10 after the application of the driving signal is stopped. Specifically, the reverberation suppression signal is applied to the ultrasonic transducer 10 during a time period in which the reverberation occurs after the application of the driving signal is stopped. In other words, the ultrasonic transducer 10 is driven so that the reverberation is suppressed during the time period in which the reverberation occurs with the reverberation suppression signal.

Figure 5A:
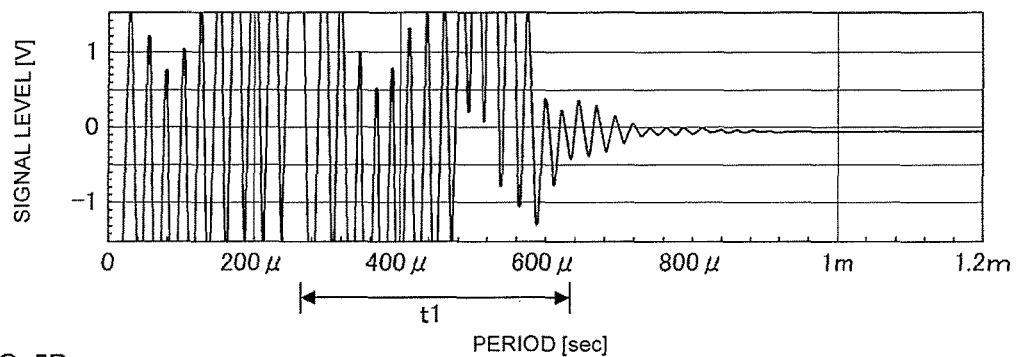
FIG. 5A illustrates a waveform of ultrasonic waves from an ultrasonic transducer, which is driven with the high-frequency signal including the reverberation suppression signal.
Figure 5B:
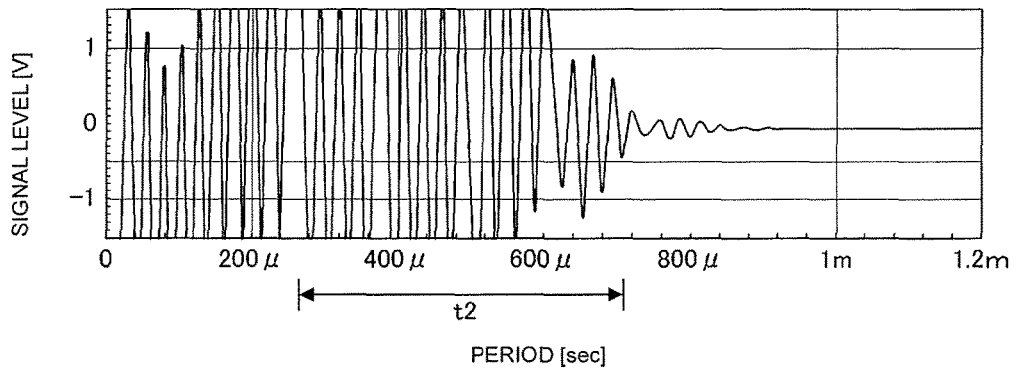
FIG. 5B illustrates a waveform of ultrasonic waves from the ultrasonic transducer, which is driven with the high-frequency signal that does not include the reverberation suppression signal.

FIG. 5A illustrates a waveform of the vibration occurring at the ultrasonic transducer 10, which is driven with the high-frequency signal including the reverberation suppression signal. FIG. 5B illustrates a waveform of the vibration occurring at the ultrasonic transducer 10, which is driven with the high-frequency signal that does not include the reverberation suppression signal. The driving signal is applied to the ultrasonic transducer 10 to about 250 μsec, as illustrated in FIG. 2. Accordingly, the waveforms subsequent to the period of about 250 μsec illustrate reverberation waveforms in FIG. 5A and FIG. 5B.

As illustrated in FIG. 5A and FIG. 5B, in comparison of times before the signal level of the reverberation waveform reaches about ±400 mV, a time t1 before the signal level of the reverberation waveform reaches about ±400 mV in FIG. 5A is shorter than a time t2 before the signal level of the reverberation waveform reaches about ±400 mV in FIG. 5B by about 70 μsec. This indicates that the application of the reverberation suppression signal during the reverberation period after the application of the driving signal to the ultrasonic transducer 10 is stopped reduces the time period in which the reverberation occurs, compared with the related art.

The reason why the time period in which the reverberation occurs is reduced will now be described.

The ultrasonic transducer 10 includes the electrode and the piezoelectric body, as described above. In general, a series resonant circuit composed of an inductor and a capacitor is connected to the piezoelectric body. In addition, a capacitor is connected in parallel to the piezoelectric body and the capacitor composes a parallel resonant circuit with the secondary winding of the step-up transformer in the matching circuit 13. Energy alternately moves between the series resonant circuit and the parallel resonant circuit to cause the reverberation. If no resistor exists in the circuit and no mechanical vibration leakage occurs at the ultrasonic transducer 10, the energy is stored and the reverberation continues. However, the reverberation diminishes and disappears with time due to the existence of the resistor and so on.

Energy is induced also at the primary side of the step-up transformer in the matching circuit 13 due to the effect of the reverberation and the secondary side is affected by the energy again. Accordingly, the vibration during the reverberation period is not in phase with the vibration in the transmission of the ultrasonic waves and the phase of the vibration during the reverberation period is complicated.

In the present embodiment, since the reverberation suppression signal is applied to the ultrasonic transducer 10 at a frequency different from that of the driving signal at a time delayed from the driving signal by the half wavelength, the amplitude is increased immediately after the application of the reverberation suppression signal but the amplitude is subsequently rapidly attenuated. This is because the application of the reverberation suppression signal causes phase change so that the 40 kHz signal components that are complicatedly superimposed cancel each other.

Figure 6:
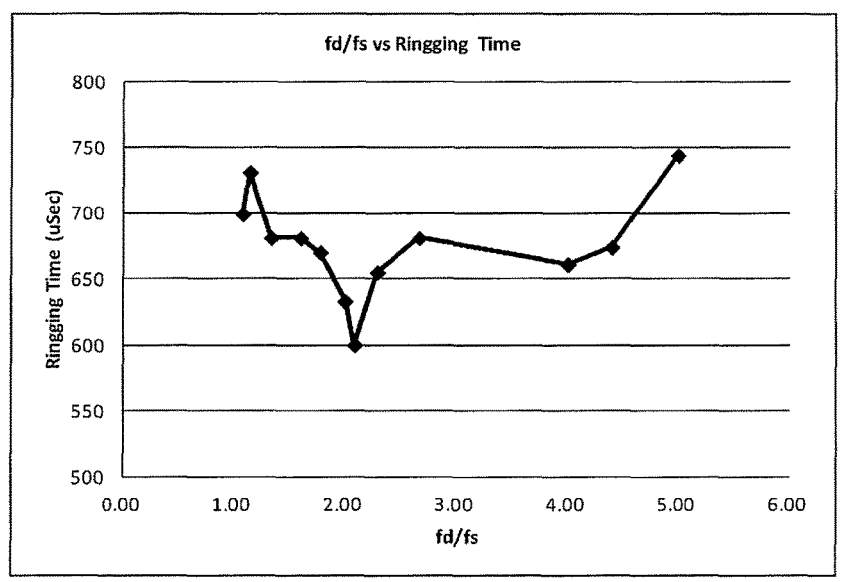
FIG. 6 is a graph illustrating reverberation times with respect to the frequencies of the driving signal and the reverberation suppression signal.
Figure 7:
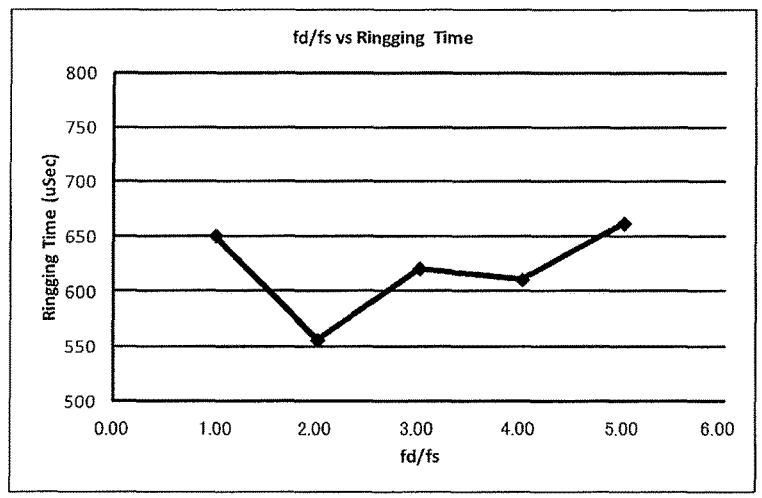
FIG. 7 is a graph illustrating reverberation times with respect to the frequencies of the driving signal and the reverberation suppression signal.

FIG. 6 and FIG. 7 are graphs illustrating the reverberation times with respect to the frequencies of the driving signal and the reverberation suppression signal. In FIG. 6 and FIG. 7, the frequency of the driving signal is denoted by fd and the frequency of the reverberation suppression signal is denoted by fs. The horizontal axis represents frequency ratio fd/fs and the vertical axis represents reverberation duration in FIG. 6 and FIG. 7. In FIG. 6 and FIG. 7, the time period from the time when the application of the driving signal is started to the time when the signal level of the reverberation waveform is lower than or equal to ±400 mV is set as the reverberation duration.

The transition of the reverberation duration when the frequency fd of the driving signal is set to 40 kHz and the frequency fs of the reverberation suppression signal is set to 8 kHz, 9.1 kHz, 10 kHz, 15 kHz, 17.5 kHz, 19.2 kHz, 20 kHz, 22.5 kHz, 25 kHz, 30 kHz, 35 kHz, and 37 kHz is illustrated in FIG. 6.

FIG. 6 indicates that the reverberation duration is reduced by setting the frequency fs of the reverberation suppression signal within a range from 10 kHz to 30 kHz, that is, by setting the frequency fs of the reverberation suppression signal within a range from 1/1.33 times to 1/4 times the frequency fd of the driving signal. FIG. 6 indicates that the reverberation duration is further reduced by preferably setting the frequency fs of the reverberation suppression signal within a range from 17.5 kHz to 22.5 kHz, that is, by preferably setting the frequency fs of the reverberation suppression signal within a range from 1/1.78 times to 1/2.3 times the frequency fd of the driving signal. FIG. 6 indicates that the reverberation duration is minimized by setting the frequency fs of the reverberation suppression signal to 20 kHz, that is, by setting the frequency fs of the reverberation suppression signal to 1/2 times the frequency fd of the driving signal.

The transition of the reverberation duration when the frequency fd of the driving signal is set to 48 kHz and the frequency fs of the reverberation suppression signal is set to 9.6 kHz, 12 kHz, 16 kHz, 24 kHz, and 28 kHz is illustrated in FIG. 7. In this case, the reverberation duration is minimized when fd/fs is about 2.0.

Accordingly, it is possible to effectively suppress the reverberation when the frequency of the reverberation suppression signal is about 1/2 of the frequency of the driving signal.

Second Embodiment

Figure 8:
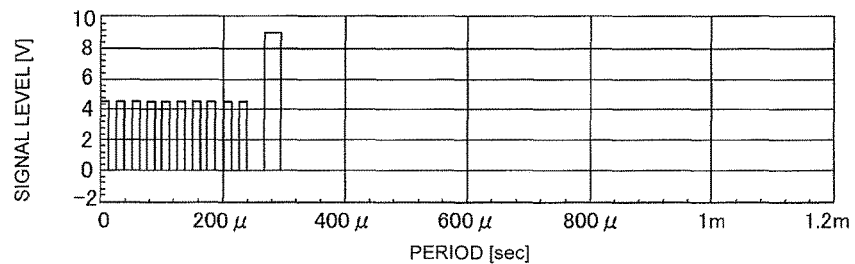
FIG. 8 illustrates a waveform of the high-frequency signal resulting from addition of the driving signal to the reverberation suppression signal in the combining circuit.

The circuit block diagram of an ultrasonic sensor according to the present embodiment is the same as the circuit block diagram illustrated in FIG. 1. In the present embodiment, the reverberation suppression signal generation circuit 112 generates the reverberation suppression signal having a signal level that is about twice the signal level of the driving signal. FIG. 8 illustrates a waveform of the high-frequency signal resulting from addition of the driving signal to the reverberation suppression signal in the combining circuit 113. As illustrated in FIG. 8, the driving signal generation circuit 111 generates ten pulse signals and that has a frequency of about 40 kHz and a signal level (amplitude) of about 4.5 V. The reverberation suppression signal generation circuit 112 generates one pulse signal and that has a frequency of about 20 kHz and a signal level (amplitude) of about 9.0 V as the reverberation suppression signal. In the present embodiment, the reverberation suppression signal is applied to the ultrasonic transducer 10 about the half waveform of the driving signal after the application of the driving signal is stopped, as in the first embodiment.

Figure 9:
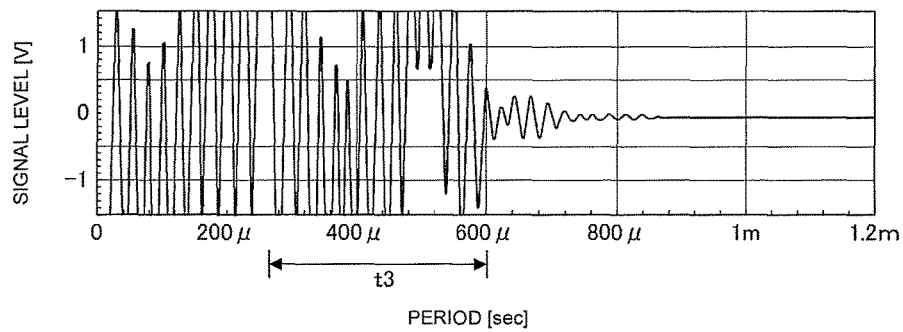
FIG. 9 illustrates a waveform of vibration occurring at the ultrasonic transducer, which is driven with the high-frequency signal including the reverberation suppression signal in a second embodiment.

FIG. 9 illustrates a waveform of the vibration occurring at the ultrasonic transducer 10, which is driven with the high-frequency signal including the reverberation suppression signal in the second embodiment. A time t3 before the signal level of the reverberation waveform reaches about ±400 mV in the present embodiment is shorter than the time t2 illustrated in FIG. 5B by about 100 μsec. This indicates that the application of the reverberation suppression signal during the reverberation period after the application of the driving signal to the ultrasonic transducer 10 is stopped reduces the time period in which the reverberation occurs, compared with the related art.

The specific configuration, etc. of the ultrasonic sensor driving circuit may be appropriately subjected to design change. The effects and advantages described in the above embodiments are only preferred effects and advantages of the present invention and the effects and advantages according to the present invention are not limited to the ones described in the above embodiments.

For example, although the reverberation suppression signal generation circuit 112 generates only one pulse of the reverberation suppression signal in the above embodiments, the reverberation suppression signal generation circuit 112 may generate one or more pulses of the reverberation suppression signal. Although the reverberation suppression signal generation circuit 112 generates the reverberation suppression signal to be applied to the ultrasonic transducer 10 the half waveform after the application of the driving signal is stopped, the reverberation suppression signal generation circuit 112 may generate the reverberation suppression signal to be applied to the ultrasonic transducer 10 λ/4 or 3λ/4 after the application of the driving signal is stopped, where λ denotes the wavelength of the driving signal.

REFERENCE SIGNS LIST

1 ultrasonic sensor
10 ultrasonic transducer
11 signal generation circuit
12 amplifier
13 matching circuit
111 driving signal generation circuit
112 reverberation suppression signal generation circuit
113 combining circuit

The invention claimed is:

1. An ultrasonic sensor driving circuit comprising:
a signal generation circuit that generates a driving signal and a reverberation suppression signal for an ultrasonic transducer, the reverberation suppression signal suppressing reverberation occurring at the ultrasonic transducer when ultrasonic waves are transmitted by the ultrasonic transducer in response to the driving signal; and
a matching circuit that includes a step-up transformer and that performs impedance matching between the signal generation circuit and the ultrasonic transducer,
wherein the driving signal has a first frequency and the reverberation suppression signal has a frequency that is different from a frequency of the driving signal, and
wherein the signal generation circuit applies the reverberation suppression signal to the ultrasonic transducer after the driving signal is applied to the ultrasonic transducer.

2. The ultrasonic sensor driving circuit according to claim 1, wherein the signal generation circuit generates the reverberation suppression signal having a frequency of 1/1.33 times to 1/4 times the frequency of the driving signal.

3. The ultrasonic sensor driving circuit according to claim 1, wherein the signal generation circuit generates the reverberation suppression signal having a frequency of 1/1.7 times to 1/2.3 times the frequency of the driving signal.

4. The ultrasonic sensor driving circuit according to claim 1, wherein the signal generation circuit generates the reverberation suppression signal having a frequency of 1/2 times the frequency of the driving signal.

5. The ultrasonic sensor driving circuit according to claim 1, wherein the signal generation circuit transmits the reverberation suppression signal to the ultrasonic transducer at a time delay from the driving signal.

6. The ultrasonic sensor driving circuit according to claim 5, wherein the reverberation suppression signal is time delayed by a half wavelength of the driving signal.

7. The ultrasonic sensor driving circuit according to claim 1, wherein the signal generation circuit generates the reverberation suppression signal with a voltage amplitude greater than a voltage amplitude of the driving signal.

8. The ultrasonic sensor driving circuit according to claim 7, wherein the voltage amplitude of the signal generation circuit is two times the voltage amplitude of the driving signal.

9. The ultrasonic sensor driving circuit according to claim 1, wherein the signal generation circuit further comprises a combining circuit that adds the driving signal to the reverberation suppression signal.

10. A method for driving an ultrasonic sensor driving circuit, the method comprising:
generating, by a signal generation circuit, a driving signal having a first frequency;
applying the driving signal to an ultrasonic transducer to generate ultrasonic waves;
generating, by the signal generation circuit, a reverberation suppression signal having a second frequency different than the first frequency;
performing impedance matching between the signal generation circuit and the ultrasonic transducer; and
applying the reverberation suppression signal to the ultrasonic transducer after the driving signal is applied to the ultrasonic transducer to suppress reverberation occurring when the ultrasonic transducer generates the ultrasonic waves.

11. The method according to claim 10, further comprising generating the reverberation suppression signal at the second frequency that is 1/1.33 times to 1/4 times the first frequency of the driving signal.

12. The method according to claim 10, further comprising generating the reverberation suppression signal at the second frequency that is 1/1.7 times to 1/2.3 times the first frequency of the driving signal.

13. The method according to claim 10, further comprising generating the reverberation suppression signal at the second frequency that is 1/2 times the first frequency of the driving signal.

14. The method according to claim 10, further comprising transmitting, by the signal generation circuit, the reverberation suppression signal to the ultrasonic transducer at a time delay from the driving signal.

15. The method according to claim 14, wherein the reverberation suppression signal is time delayed by a half wavelength of the driving signal.

16. The method according to claim 10, further comprising generates, by the signal generation circuit, the reverberation suppression signal with a voltage amplitude greater than a voltage amplitude of the driving signal.

17. The method according to claim 16, wherein the voltage amplitude of the signal generation circuit is two times the voltage amplitude of the driving signal.

18. The method according to claim 10, further comprising combining the driving signal to the reverberation suppression signal.

* * * * *